United States Patent
Ojika et al.

(10) Patent No.: US 11,070,054 B2
(45) Date of Patent: Jul. 20, 2021

(54) POWER CONTROLLER (71) Applicant: Mitsubishi Electric Corporation, Chiyoda-ku (JP)

(72) Inventors: Satoshi Ojika, Chiyoda-ku (JP); Tomokazu Sakashita, Chiyoda-ku (JP); Toshio Okamura, Chiyoda-ku (JP); Shinichiro Oikawa, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 337 days.

(21) Appl. No.: 16/070,931

(22) PCT Filed: Feb. 26, 2016

(86) PCT No.: PCT/JP2016/055832
§ 371 (c)(1),
(2) Date: Jul. 18, 2018

(87) PCT Pub. No.: WO2017/145362
PCT Pub. Date: Aug. 31, 2017

(65) Prior Publication Data
US 2020/0280184 A1   Sep. 3, 2020

(51) Int. Cl.
*H02J 1/10* (2006.01)
*B64G 1/42* (2006.01)
(Continued)

(52) U.S. Cl.
CPC ............. *H02J 1/10* (2013.01); *B64G 1/425* (2013.01); *B64G 1/428* (2013.01); *B64G 1/443* (2013.01); *H02J 1/14* (2013.01)

(58) Field of Classification Search
CPC .... H02J 1/10; H02J 1/14; B64G 1/425; B64G 1/428; B64G 1/443
See application file for complete search history.

(56) References Cited

U.S. PATENT DOCUMENTS 6,459,171 B1 * 10/2002 Leifer .................. H02J 1/10
307/52
2012/0248880 A1    10/2012 Alonso et al.
(Continued)

FOREIGN PATENT DOCUMENTS

JP        2-36736 A      2/1990
JP      2012-10542 A     1/2012
(Continued)

OTHER PUBLICATIONS

European Office Action dated Jul. 4, 2019 in European Patent Application No. 16891519.7, citing document AA therein, 6 pages.
(Continued)

*Primary Examiner* — Daniel Kessie
*Assistant Examiner* — Brian K Baxter
(74) *Attorney, Agent, or Firm* — Xsensus LLP (57) ABSTRACT

A power controller includes: a plurality of switching elements provided in one-to-one correspondence with a plurality of power supplies, and each of which switches on or off to switch between supplying and stopping supplying a load with electric power from a corresponding one of the plurality of power supplies; a processing unit which computes an operation amount for adjusting an amount of the electric power supplied to the load; and a signal generator which determines, for each control, a switching-element count indicating a total number of switching elements to be turned on among the plurality of switching elements, and a duty ratio of the switching-element count, based on the operation amount, and generates a drive signal for driving the plurality of switching elements successively, based on the switching-element count and the duty ratio.

15 Claims, 5 Drawing Sheets

(51) Int. Cl.
*B64G 1/44* (2006.01)
*H02J 1/14* (2006.01)

(56) References Cited

U.S. PATENT DOCUMENTS

2013/0154588 A1* 6/2013 Gilliom ............. H02M 3/33561
  323/267
2013/0307343 A1* 11/2013 Behrends .................. H02J 1/10
  307/85
2017/0310330 A1* 10/2017 Nakajima ............... H03L 7/085

FOREIGN PATENT DOCUMENTS

| | | |
|---|---|---|
| JP | 2014-71554 A | 4/2014 |
| JP | 2015-89242 A | 5/2015 |
| RE | 1 538 723 A1 | 6/2005 |

OTHER PUBLICATIONS

Extended Search Report dated Nov. 9, 2018 in European Patent Application No. 16891519.7.
Patil A. R. et al: "Modeling and Simulation of the Space Platform Power System", vol. 2, Aug. 12, 1990, XP010301288, pp. 96-103.
International Search Report dated May 17, 2016 in PCT/JP2016/055832 filed Feb. 26, 2016.

* cited by examiner

POWER CONTROLLER

TECHNICAL FIELD

The present invention relates to a power controller which controls an amount of power supplied to a load.

BACKGROUND ART

A power controller is used to control an amount of electric power supplied to a load. For example, a power controller is employed as a bus power supply in a satellite to supply the payload with a voltage stabilized at about 50V or about 100V. A power controller for satellite is known which supplies the load with electric power generated by multiple photovoltaic arrays during sunlight hours, while short-circuiting (hereinafter, referred to as shunting) output of a particular photovoltaic array equivalent to the generated power surplus, thereby controlling the bus voltage to suppress an increase of the power bus voltage.

In such a power controller, the number of stages of photovoltaic arrays depends on a magnitude of electric power demanded to be generated. Conventionally, the photovoltaic arrays include about 10 stages to about 40 stages, each stage of the photovoltaic array being connected in parallel to a switching element which shunts the photovoltaic array in the stage In other words, the number of switching elements, which shunt the photovoltaic arrays, included in the power controller is the same as the number of stages of the photovoltaic arrays. Note that the number of stages of the photovoltaic arrays and switching elements is referred to as a shunt stage count.

In the power controller employing such a shunt system, driving on or off the switching elements that are configured of field-effect transistors connected in parallel to individual photovoltaic arrays switches the shunting or opening. The switching operation (hereinafter, referred to as switching) of the switching element between on and off involves generation of heat caused by switching losses. Thermal design is made when designing the power controller so that the power controller can withstand the conditions where generation of heats from the switching elements is max. Thus, increased expected maximum heat release from individual switching elements leads to an increased size of the apparatus.

For this reason, a system is developed (e.g., see PTD 1) which homogenizes generation of heats from switching elements to reduce the maximum heat releases from individual switching elements, thereby allowing a reduction in size and weight of a power controller. The system determines a ratio (a shunt rate) between supplying and shunting the electric power, based on an amount of excess or deficiency of the supply status of electric power for each control cycle, and calculates on-times of the switching elements based on the shunt rate. The power controller is configured to drive the switching elements successively, according to timing signals equally assigned for the switching elements. This homogenizes the switching times of all the switching elements, reducing the switching times of individual switching elements to a fraction of 1 over the shunt stage count, as compared to the switching times of the switching by the entire apparatus. This homogenizes the generation of heats in the switching elements, thereby reducing the maximum heat release and a reduction in size and weight of the power controller is allowed by mitigating the requirements for the thermal design.

CITATION LIST

Patent Document

PTD 1: Japanese Patent Laying-Open No. 2014-71554

SUMMARY OF INVENTION

Technical Problem

The power controller disclosed in PTD 1 distributes the switching, carried out by the apparatus, to all the switching elements. The switching times of the individual switching elements are reduced to a fraction of 1 over the shunt stage count, as compared to a total switching time in the apparatus. On the other hand, in order to achieve this operation, the power controller is configured to determine the on-times of the switching elements successively one stage after another for each control cycle determined by the timing signals equally assigned for the switching elements, and drive the switching elements, accordingly. For this reason, a time required to drive all the switching elements is equivalent to the shunt stage count for each control cycle, causing a responsiveness problem.

When the shunt rate needs to be modified to maintain the bus voltage, such as when the electric power consumed by a load is varied, a time required to modify the shunt rates of all the switching elements is equivalent to the shunt stage count for each control cycle. This causes a control delay dependent on the shunt stage count, and, in some cases, the bus voltage cannot be stabilized, which may lead to destruction of the apparatus.

In order to place the variation in the bus voltage due to the control delay within a tolerance, a countermeasure is necessary, such as an increased capacity of a capacitor (bus capacitor) connected in parallel to the power bus. However, this ends up preventing the reduction in size of the power controller.

The control cycle can be shortened to reduce the control delay and the responsiveness can be improved. However, this increases the switching times, and thus counteracts the effects of reducing the maximum heat release that are provided by homogenizing the generation of heats, and prevents the reduction in size and weight of the power controller since the heating values of individual switching elements increase in proportion to an increase of the switching times.

The present invention is made to solve the above problems and has an object to provide a highly responsive power controller having a reduced size and reduced weight, which reduces the maximum heat release generated in individual switching elements, and eliminates a control delay dependent on the shunt stage count.

Solution to Problem

The power controller according to the present invention is configured to be connected to a load and a plurality of power supplies which supply electric power, the power controller including: a plurality of switching elements which are provided in one-to-one correspondence with the plurality of power supplies, and each of which switches on or off to switch between supplying and stopping supplying the load with electric power from a corresponding one of the plurality of power supplies; a processing unit configured to compute an operation amount for adjusting an amount of electric power supplied to the load, and a signal generator configured to determine, for each control cycle, a switching-element count indicating a total number of switching elements to be turned on among the plurality of switching elements and a duty ratio of the switching-element count, based on the operation amount, and generate a drive signal for driving the plurality of switching elements successively, based on the switching-element count and the duty ratio.

Advantageous Effects of Invention

According to the present invention, the driven states of all the switching elements are determined based on an amount of shunt performed by the entire apparatus for each control cycle, while controlling the switching times of individual switching elements so that the switching times are reduced to a fraction of 1 over the shunt stage count, thereby reducing the heating values of individual switching elements, while eliminating the above problem, that is, the control delay dependent on the shunt stage count. Thus, a highly responsive power controller having a reduced size and reduced weight is provided.

DESCRIPTION OF EMBODIMENTS

Embodiment 1

Figure 1:
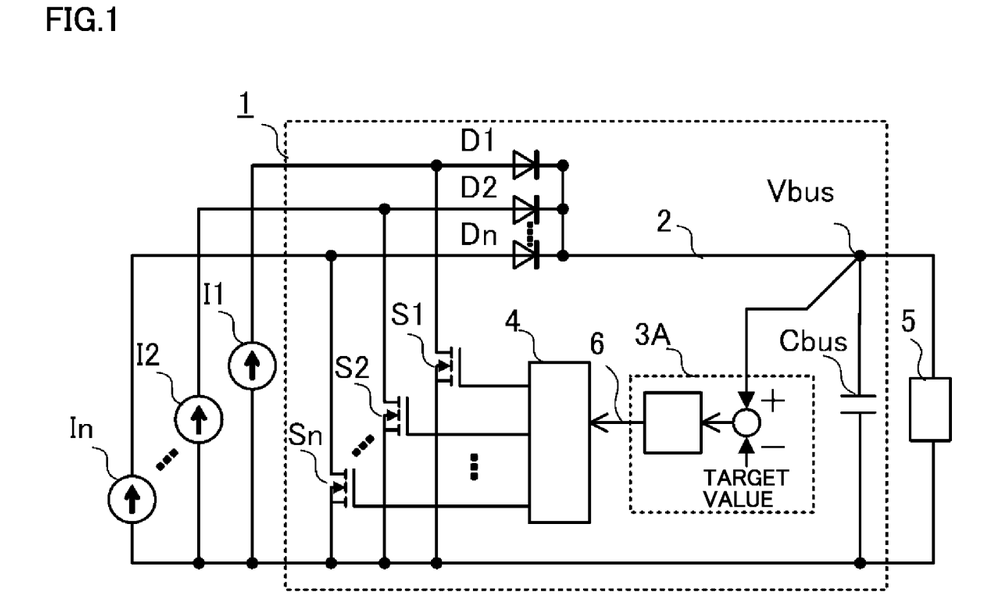
FIG. 1 is a circuit diagram showing a configuration of a power controller according to Embodiment 1.

A power controller according to Embodiment 1 of the present invention is described with reference to the accompanying drawings. FIG. 1 is a circuit diagram of the power controller according to Embodiment 1 of the present invention. As shown in FIG. 1, a power controller 1 is connected to multiple direct-current (DC) power supplies I1 to In (n is an integer greater than or equal to 3) which supply electric power, and a load 5. Power controller 1 controls amounts of electric power that are supplied from DC power supplies I1 to In to load 5.

DC power supplies I1 to In supply electric power to power controller 1. DC power supplies I1 to In are photovoltaic arrays, for example. Note that the photovoltaic array is an example of a power supply which supplies electric power, and may be replaced with another power supply which supplies power. DC power supplies I1 to In are onboard a satellite in the present embodiment. However, the present invention is not limited thereto, and DC power supplies I1 to In may be onboard another spacecraft (such as artificial planet, space station) or may be installed in apparatuses that are on the ground, on the sea, and in the air.

Power controller 1 includes: multiple switching elements S1 to Sn which are configured of: for example, field-effect transistors (FET); backflow prevention elements D1 to Dn configured of diodes; a power bus 2; a processing unit 3A; a signal generator 4, and a bus capacitor Cbus.

Switching elements S1 to Sn are provided in one-to-one correspondence with DC power supplies I1 to In. Switching elements S1 to Sn each switch on or off to switch between supplying and stopping supplying load 5 with electric power from a corresponding one of DC power supplies I1 to In. Switching elements S1 to Sn are connected in parallel to DC power supplies I1 to In, respectively. This allows a DC power supply to be shunted by turning on a corresponding switching element, thereby stopping the supply of electric power to load 5. By turning off the switching element, the electric power from the corresponding DC power supply is supplied to load 5.

While switching elements S1 to Sn are configured using, for example, field-effect transistors (FET), the present invention is not limited thereto. Another type of switching elements may be employed. While the configuration is employed where switching elements S1 to Sn are connected in parallel to DC power supplies I1 to In, the present invention is not limited thereto. The configuration may be any, insofar as the electric power from the DC power can be supplied or stopped from being supplied to the load by turning on or off the corresponding switching element.

Backflow prevention elements D1 to Dn are provided in one-to-one correspondence with DC power supplies I1 to In, and are connected in series to DC power supplies I1 to In, respectively. Backflow prevention elements D1 to Dn are configured using diodes, and prevent current from flowing back to power supplies I1 to In. Note that backflow prevention elements D1 to Dn are an example of elements which prevent current from flowing back to DC power supplies I1 to In, and may be replaced with other elements having similar functions.

DC power supplies I1 to In are connected in parallel to respective switching elements S1 to Sn between the drain terminals and the source terminals of switching elements S1 to Sn, and are also connected to power bus 2 via respective backflow prevention elements D1 to Dn. Points of connections between positive terminals of DC power supplies I1 to In and the drain terminals of switching elements S1 to Sn are connected to the anode terminals of respective back flow prevention elements D1 to Dn whose cathode terminals are connected to power bus 2. Bus capacitor Cbus and load 5 are connected in parallel and are also connected to power bus 2.

Processing unit 3A is a processing circuit which generates an operation amount for adjusting an amount of electric power supplied to load 5, according to a voltage of power bus 2. In other words, the operation amount is a shunt command value 6 which is an operation amount indicating an amount of shunt performed by the entire apparatus. Processing unit 3A detects a voltage of power bus 2, generates shunt command value 6 based on a difference value between the voltage and a predetermined target value, and outputs shunt command value 6 to signal generator 4.

Signal generator 4 is connected to switching elements S1 to Sn and processing unit 3A, and determines, for each control cycle, a switching-element count indicating the number of switching elements to be turned on among a total number of switching elements and a duty ratio of the switching-element count, based on shunt command value 6 input from processing unit 3A. Signal generator 4 has an output terminal connected to the gate terminals of switching elements S1 to Sn, and drives switching elements S1 to Sn on or off, using the drive signal output from signal generator 4.

Load 5 is, for example, a payload of the satellite, and is connected to power controller 1. Note that load 5 may be an energy storage device such as a battery, and may be connected to power controller 1 via a charge-discharge controller.

Power controller 1 according to Embodiment 1 is able to supply electric power from photovoltaic arrays I1 to In to load 5 via power bus 2, and the supplied voltage is retained at bus capacitor Cbus. Moreover, power controller 1 supplies load 5 with electric power generated by DC power supplies I1 to In during sunlight hours, while short-circuiting (shunting) the generated power surplus at arbitrary time intervals in an arbitrary ratio, thereby controlling the bus voltage to suppress an increase of bus voltage Vbus.

Next, an operation of power controller 1 according to the present embodiment is described. In Embodiment 1, processing unit 3A outputs shunt command value 6, which is the operation amount for adjusting the amount of electric power supplied to load 5, to reduce the difference between bus voltage Vbus and the predetermined target value, thereby controlling and keeping bus voltage Vbus constant. In the following, an operation of processing unit 3A is described with reference to, but not limited to, applying PID (proportional-integral-derivative) control to a deviation Err. Deviation Err is the difference between bus voltage Vbus and the target value. The target value is a rated value of bus voltage Vbus. Generally, the target value is, but not limited to, 50V or 100V.

Initially, processing unit 3A takes a difference between bus voltage Vbus of power bus 2 detected by a voltage detector (not shown) and the predetermined target value, and calculates deviation Err. Deviation Err is represented by Equation (1).

$$\text{Err} = \text{Vbus} - \text{Target value} \quad (1)$$

Processing unit 3A computes values of a proportional term, integral term, and derivative term for deviation Err, and outputs a signal obtained by adding the values together, as shunt command value 6. In other words, shunt command value 6 is represented by Equation (2) with constants KP, KI, and KD:

$$\text{Shunt command value} = KP \cdot Err + KI \int Err \cdot dt + KD \frac{d}{dt} Err \quad (2)$$

Any numeric values greater than or equal to 0 are chosen for constants KP, KI, and KD in Equation (2) to provide targeted control according to the circuit constants over the bus voltage to keep the bus voltage constant. Shunt command value 6 is a numeric value indicating an average number of switching elements that shunt per control cycle. An effective value of shunt command value 6 is any value from 0 to n in the power controller according to Embodiment 1. Shunt command value 6 being 0 means supplying all the generated electric power to the load, and being n means shunting all the generated electric power and stopping the supply of electric power to the load.

Shunt command value 6 computed by processing unit 3A is transmitted to signal generator 4. In order to achieve the number of switching elements that shunt per control cycle as indicated by the input shunt command value 6, signal generator 4 determines the switching-element count (hereinafter, referred to as an ON count) indicating the number of switching elements to be turned on and a percentage (hereinafter, referred to as the duty ratio) of a time of that ON count over a control cycle. The switching elements are driven based on the ON count. The drive signal is generated so that switching elements S1 to Sn are driven successively, without concentratedly switching a particular switching element upon increase or decrease of the ON count. In the following, the description is given in detail.

Figure 2:
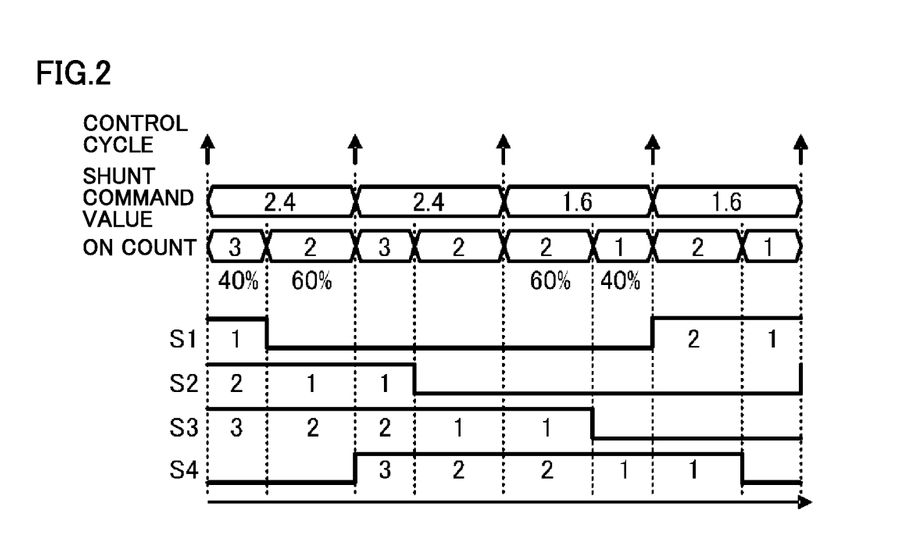
FIG. 2 is a timing chart showing an operation of the power controller according to Embodiment 1.

FIG. 2 is a timing chart showing an operation of power controller 1 according to Embodiment 1. In FIG. 2, passage of time is indicated on the horizontal axis, and a state of each signal is indicated on the vertical axis. Here, for ease of explanation, a case is illustrated where the shunt stage count n is, but not limited to, 4. In the following, example operations of signal generator 4 when shunt command value 6 is 2.4 and 1.6 are described with reference to FIG. 2.

Initially, shunt command value 6 is 2.4 in the first and second control cycles, and thus the ON count is set to 3 in 40% of the control cycle and the ON count is set to 2 in 60% of the control cycle to achieve an average value 2.4. Since the ON count is initially set to 3, three switching elements are turned on starting from switching element S1. In other words, switching elements S1 to S3 are turned on. Next, as the ON count decreases to 2, the switching elements are rotated and two switching elements are turned on, starting from switching element S2. In other words, switching elements S2 and S3 are turned on. As power controller 1 enters the second control cycle, the ON count increases to 3. Thus, three switching elements are on, with switching element S2 remained as a switching element to be first turned on, without being rotated to another. In other words, switching elements S2 to S4 are turned on. When the ON count next decreases to 2, the switching elements are rotated as with the first control cycle, and two switching elements are turned on, starting from switching element S3. In other words, switching elements S3 and S4 are turned on.

In the third and fourth control cycles, 1.6 is input to the shunt command value, and thus the ON count is set to 2 in 60% of each control cycle and the ON count is set to 1 in 40% of each control cycle to achieve an average value 1.6. First, the ON count remains 2 continuously from the second control cycle. Next, the switching elements are rotated as the ON count decreases to 1, and one switching element is turned on, starting from switching element S4. As power controller 1 enters the fourth control cycle, the ON count increases to 2. Thus, two switching elements are turned on, starting from switching element S4. At this time, switching elements S4 and S1 are turned on because switching element S5 does not exist. Next, the ON count decreases to 1 and thus the switching elements are rotated and one switching element is turned on, starting from switching element S1. As such, the switching element from which the switching element are turned on changes for each control cycle, thereby allowing the distribution of the switching operation to all switching elements S1 to S4 and reducing the number of times the individual switching elements switch every four control cycles.

As a result, power controller 1, as a whole, where the shunt stage count is n, carries out the switching in the same cycle as the control cycle, while the switching operations by individual switching elements S1 to Sn are every n control cycle(s). Since the switching times of individual switching elements S1 to Sn are reduced to 1/n of the switching times of the switching by the entire apparatus, exothermic conditions required for switching elements S1 to Sn are reduced. Moreover, since the states of all the switching elements are determined for each control cycle and the switching elements are driven accordingly, a control delay dependent on the shunt stage count n does not occur.

In the power controller according to Embodiment 1, as the ON count decreases as described above, a switching element from which the switching elements are turned on is rotated to another switching element, thereby driving to off a switching element that has the longest on-time among switching elements being on. Likewise, as the ON count increases, the number of switching elements including the starting switching element and equivalent to the ON count are turned on, thereby driving to on a switching element that has the longest off-time among switching elements being off. While the example is described here in which the ON count decreases by 1 and thus a switching element from which the switching elements are turned on is rotated by 1, it should be noted that in the case where the ON count decreases by 2 or more, the switching elements can be rotated according to the decrease in the ON count.

Figure 3:
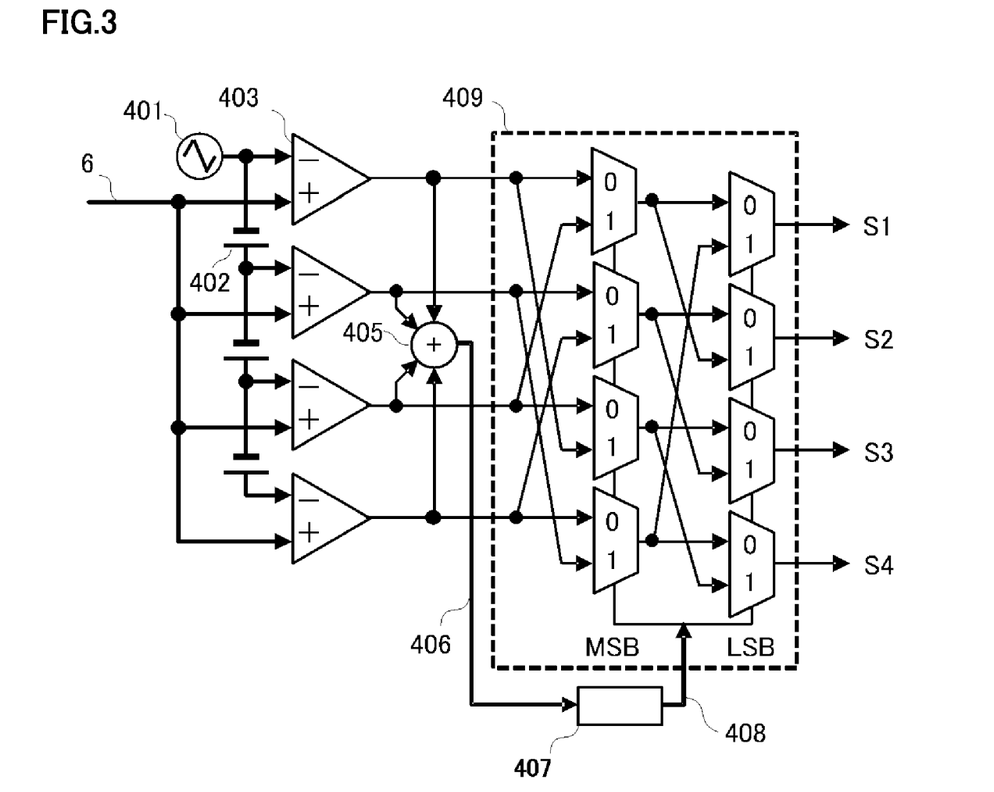
FIG. 3 is a block diagram showing a configuration of a signal generator 4 included in the power controller according to Embodiment 1.
Figure 4:
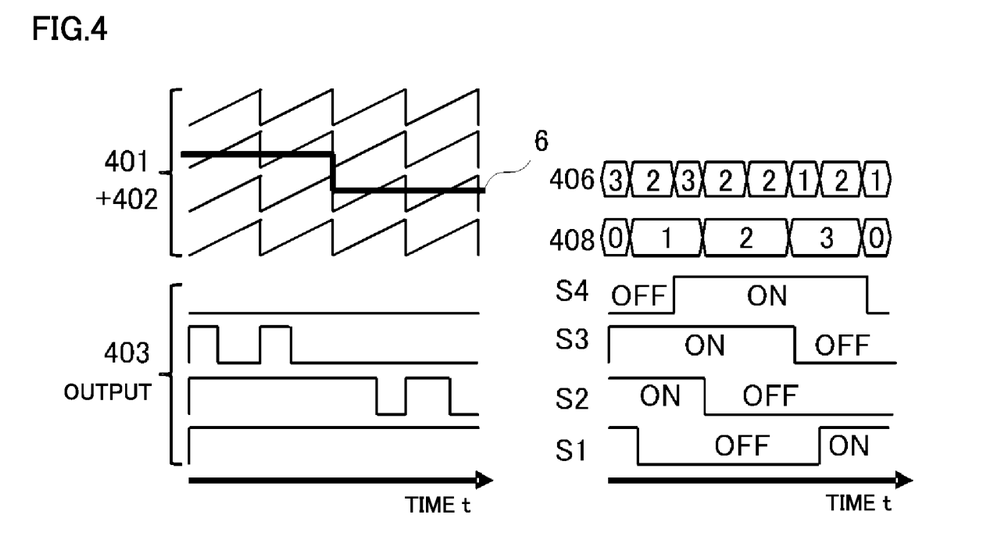
FIG. 4 is a diagram showing waveforms generated by signal generator 4 included in the power controller according to Embodiment 1.

FIG. 3 is a block diagram showing a configuration of signal generator 4 according to Embodiment 1. FIG. 4 is a diagram showing waveforms generated by each component. In the waveform diagram in FIG. 4, passage of time is indicated on the horizontal axis, and a state of each signal is indicated on the vertical axis. Here, for ease of explanation, a case is illustrated where the shunt stage count n is 4. In order to achieve the operation shown in FIG. 2, signal generator 4 shown in FIG. 3 includes a carrier wave generator 401, an offset superimposing unit 402, comparators 403, an adder 405, an offset determination unit 407, and a shunt allocation unit 409.

Initially, carrier wave generator 401 included in signal generator 4 generates a carrier wave having amplitude 1. Offset superimposing unit 402 adds, to the carrier wave generated by carrier wave generator 401, an offset equivalent to the amplitude of the carrier wave, and a signal obtained therefrom is input to an input terminal of comparator 403. Shunt command value 6 which is the operation amount is input to another input terminal of comparator 403. This operation results in pulse width modulation (PWM) signals obtained by dividing the operation amount by the shunt stage count, and causes a number of comparators 403 equivalent to the ON count in FIG. 2 to output the logical value "1." This causes adder 405 to add the outputs from the comparators together, resulting in an ON count 406 for the switching elements.

When a decrease in ON count 406 is sensed, offset generator 407 adds the decrease to offset value 408 by a modular arithmetic method using modulo n. Offset value 408 is different from the carrier wave offset, and indicates a switching element from which the switching elements are driven. Offset value 408 is 0 to (n−1). When offset value 408 is 0, the switching elements are driven, starting from switching element S1, when offset value 408 is 1, the switching elements are driven, starting from switching element S2, and so on.

The PWM signals and offset value 408 determined thus far fix a drive pattern for the switching elements and a switching element from which the switching elements are driven, thereby uniquely determining a driven state (on/off) of each switching element. Shunt allocation unit 409 shifts the PWM signals output from comparators 403 by offset value 408 by a cyclic shift operation, and drives the switching elements on or off. The example is described in FIG. 3 where multiplexers each having 2 inputs and 1 output are combined to implement the cyclic shift. However, multiplexers each having multiple inputs may be used to implement the cyclic shift.

While the term of Vbus is positive and the target value is negative in Equation (1) for the deviation used for the description of Embodiment 1, it should be noted that the target value may be positive and the term of Vbus may be negative, and the signs in the subsequent equations may be inverted. While the PID control is described as an example of Equation (2) for the shunt command value which is the operation amount, where the values of the proportional term, integral term, and derivative term for the difference between the bus voltage and the target value are computed and used, the equation and the operation amount may be replaced with any other operation amount and any other equation, insofar as an increased amount of current is shunt as the bus voltage increases.

Figure 10:
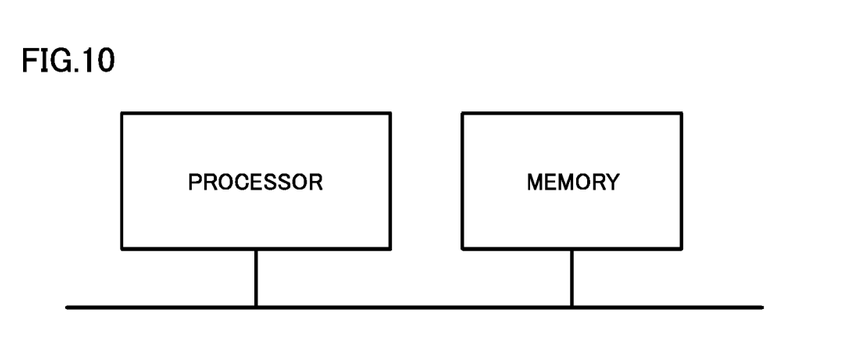
FIG. 10 is a block diagram showing an example of a hardware configuration of components included in the power controller according to Embodiments 1 to 3.

Moreover, operations corresponding to the operations of processing unit 3A and signal generator 4 according to the present embodiment described above may be embodied in hardware or software of a digital circuit and carried out in the form of digital signal processing. In order to embody processing unit 3A and signal generator 4 in software and perform the processing, processing unit 3A and signal generator 4 may be embodied in a processor and a memory as shown in FIG. 10, for example, and the processor may be configured to process a program stored in the memory.

While, for ease of explanation, the timing chart (FIG. 2) in the present embodiment has been described with reference to the carrier wave, generated by carrier wave generator 401 included in signal generator 4, being a sawtooth wave, the carrier wave may be an inverse sawtooth wave or a triangle wave that has an arbitrary duty ratio. While signal generator 4 according to the present embodiment has been described with reference to the example in which signal generator 4 superimposes an offset on a common carrier wave using carrier wave generator 401 and offset superimposing unit 402, signal generator 4 may separately generate carrier waves having different offsets, or subtract the offset from the operation amount. While signal generator 4 according to the present embodiment has been described with reference to the example in which the number of a switching element from which the switching elements are turned on is increased with a decrease of the ON count, similar advantageous effects are provided even by decreasing the number of the switching element from which the switching elements are turned on with an increase of the ON count.

As such, in the power controller according to the present embodiment, the power controller which controls and keeps the bus voltage constant; finds the shunt command value, which is an average number of switching elements that shunt per control cycle, from a deviation of the bus voltage from the target value; controls the ON count of the switching elements and the duty ratio; and rotates, as the ON count increases or decreases, the switching elements to be driven, thereby reducing the switching frequency of individual switching elements to 1/n of that of the entire apparatus and causing no delay dependent on the shunt stage count. Thus, the power controller according to the present embodiment achieves high responsiveness Thus, even in the configuration where the shunt stage count n is large, generation of heat associated with the switching can be reduced, while maintaining responsiveness of the power controller. A highly responsive power controller having a reduced site and reduced weight is thereby provided by mitigating the selection of parts and the requirements for the heat sinking design.

Embodiment 2

A power controller according to Embodiment 2 of the present invention is described. Power controller 1 according to the present embodiment is the same as power controller 1 according to Embodiment 1, except for the configuration of a signal generator 4. As with Embodiment 1, power controller 1 according to the present embodiment controls and keeps a bus voltage constant, based on the operation illustrated in the timing chart in FIG. 2. The power controller according to Embodiment 2 has a configuration same as shown in FIG. 1, and thus the description will not be repeated.

Figure 5:
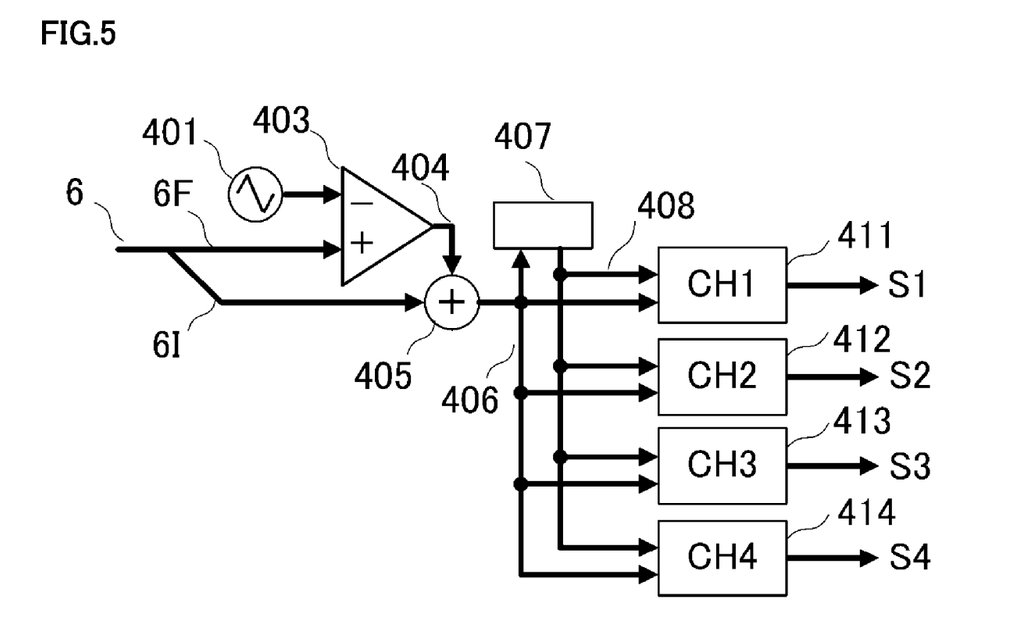
FIG. 5 is a block diagram showing a configuration of a signal generator 4 included in a power controller according to Embodiment 2.
Figure 6:
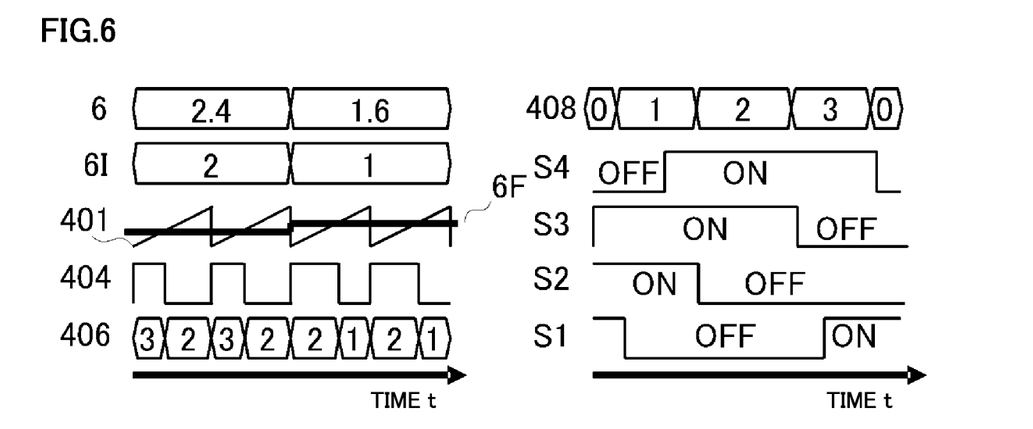
FIG. 6 is a diagram showing waveforms generated by signal generator 4 included in the power controller according to Embodiment 2.

FIG. 5 is a block diagram showing a configuration of signal generator 4 included in the power controller according to Embodiment 2. FIG. 6 is a diagram showing waveforms generated by each component. In the waveform diagram in FIG. 6, passage of time is indicated on the horizontal axis, and a state of each signal is indicated on the vertical axis. Here, for ease of explanation, a case is illustrated where the shunt stage count n is 4. However, the present invention is not limited thereto. In order to achieve the operation illustrated in the timing chart in FIG. 2, signal generator 4 includes a carrier wave generator 401, a comparator 403, an adder 405, an offset determination unit 407, and driven-state determination units 411, 412, 413, and 414. The components in FIG. 5 that are given the same reference signs as in FIG. 3 are the same as or corresponding to the components shown in FIG. 3.

Next, an operation of the power controller according to Embodiment 2 is described. An operation or the entire power controller according to Embodiment 2 is the same as described in Embodiment 1. Here, an operation of signal generator 4 is described.

Initially, signal generator 4 divides a shunt command value 6, input from processing unit 3A, into an integer part 6I and a decimal part 6F. A valid range of shunt command value 6 is 0 to n, and thus integer part 6I is an integer of 0 to n, and decimal part 6F is a decimal value of 0 or greater and less than 1. Comparator 403 compares decimal part 6F with a carrier wave generated by carrier wave generator 401, and generates a decimal-part pulse width modulation (PWM) signal 408. Decimal-part PWM signal 408 outputs 0 and 1 in an arbitrary duty ratio, and an average value of the outputs represents decimal part 6F. Adder 405 adds integer part 6I and decimal-part PWM signal 408 together to calculate an ON count 406 of the switching elements.

When a decrease in ON count 406 is sensed, offset generator 407 adds the decease to offset value 408 by a modular arithmetic method using modulo n. Offset value 408 indicates a switching element from which the switching elements are driven. Offset value 408 is a value in a range from 0 to (n−1). When offset value 408 is 0, the switching elements are driven, starting from switching element S1, when offset value 408 is 1, the switching elements are driven, starting from switching element S2, and so on.

ON count 406 and offset value 408 determined thus far fix the number of switching elements to be turned on and a switching element from which the switching elements are turned on, thereby uniquely determining a driven state (on/off) of each switching element. Driven-state determination units 411 to 414 determine, from ON count 406 and offset value 408, whether the switching elements belong to a range to be turned on, and determines whether to drive the switching elements. Such a configuration allows reduction in amount of computation, as compared to the power controller according to Embodiment 1.

Note that signal generator 4 included in power controller 1 according to Embodiment 2 may also be embodied in hardware or software of a digital circuit and carried out in the form of digital signal processing, as with Embodiment 1. In order to embody signal generator 4 in software and perform the processing, signal generator 4 may be embodied in a processor and a memory as shown in FIG. 10, for example, and the processor may be configured to process a program stored in the memory.

Figure 7:
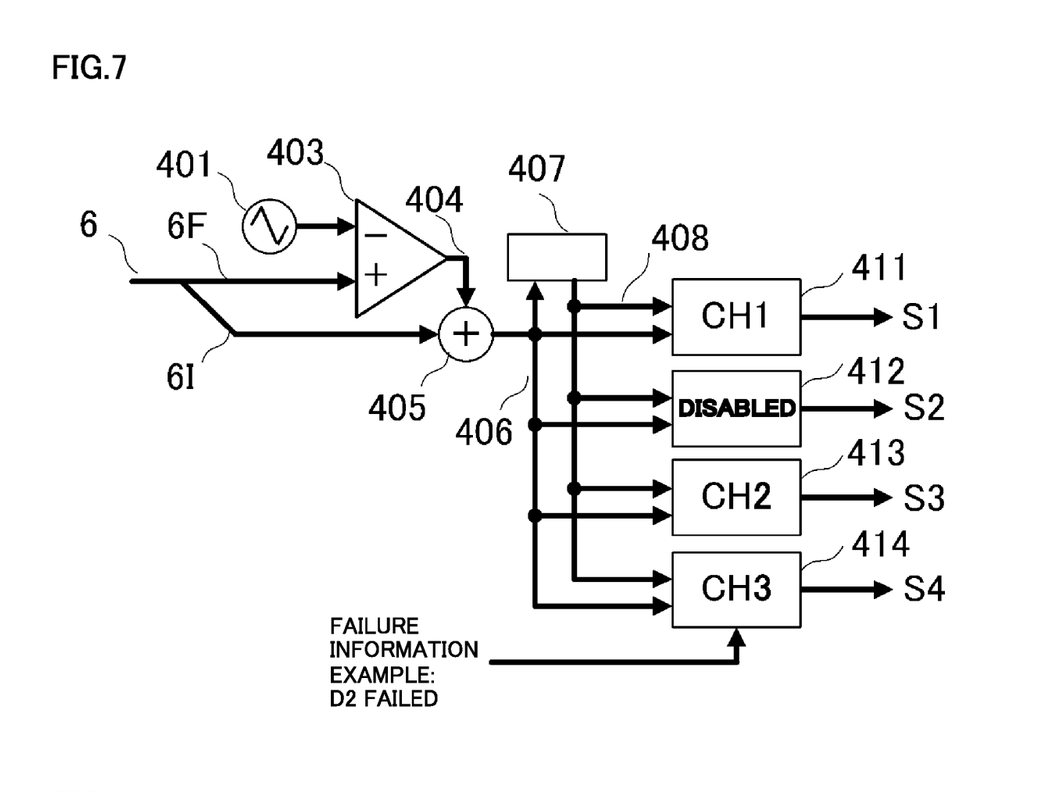
FIG. 7 is a block diagram showing an operation of signal generator 4 in the event of failure of an element included in the power controller according to Embodiment 2.
Figure 8:
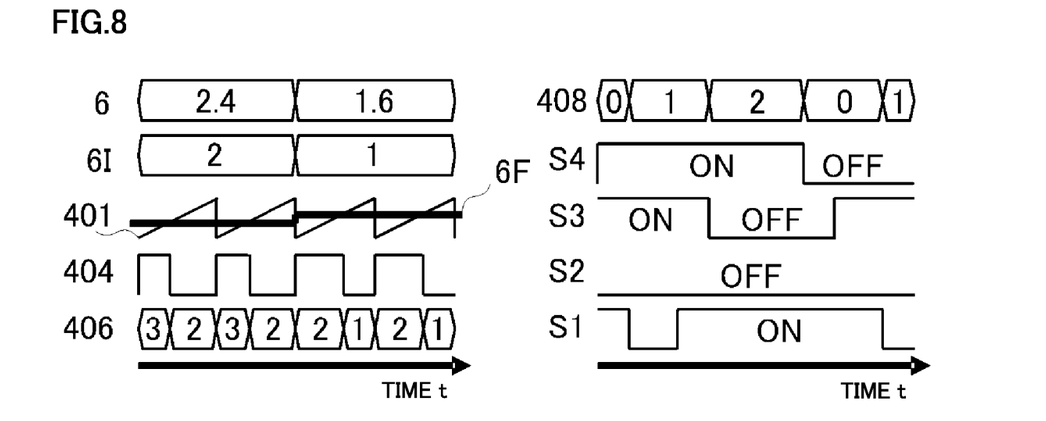
FIG. 8 is a diagram showing waveforms generated by signal generator 4 in the event of failure of an element included in the power controller according to Embodiment 2.

In the event of failure of one of components included in power controller 1, if a switching element that is connected to the failed component is turned on, such a problem may occur as formation of a short-circuit or flow of an excessive current through the switching element. According to the configuration of Embodiment 2, the operation of signal generator 4 is modified based on failure information sensed in power controller 1 or failure information input from outside of power controller 1, thereby implementing power control, without causing the problem. FIG. 7 is a diagram showing an operation of signal generator 4 in the event of failure of backflow prevention element D2, for example. FIG. 8 is a diagram showing waveforms generated by each component. In the waveform diagram in FIG. 8, passage of time is indicated on the horizontal axis, and a state of each signal is indicated on the vertical axis. FIG. 7 indicates a difference from FIG. 5 in boldface. The failure information is input to driven-state determination units 411 to 414, and driven-state determination unit 412 that is configured to drive switching element S2 connected to the failed backflow prevention element D2 is disabled. At this time, degradation in the control characteristics is introduced if a switching element to be driven is missing. Thus, the operations of driven-state determination units 413 to 414 are modified so that switching elements S3 and S4 are respectively driven as the second and third switching elements. As a result, the power controller is able to operate as having three shunt stages.

As such, the power controller according to Embodiment 2 has features similar to the power controller according to Embodiment 1. Thus, a power controller that is highly responsive and has a reduced size and reduced weight, as with Embodiment 1, can be provided. In addition, in order to achieve signal generator 4 particularly in the form or hardware or software of a digital circuit, a power controller having a reduced circuit size and a reduced program size as compared to Embodiment 1 can be configured by reducing the amount of computation. This allows a more inexpensive power controller to be provided. Further, since the operation of controlling the bus voltage can be continued in the normal manner even in the event of failure, a power controller that is highly reliable as compared to Embodiment 1 can be provided.

Embodiment 3

Figure 9:
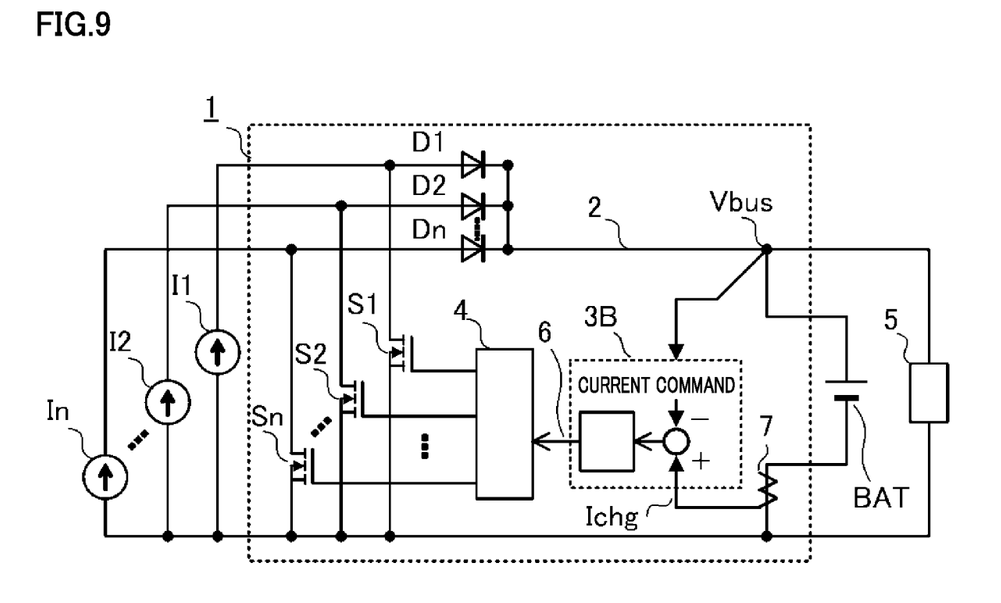
FIG. 9 is a circuit diagram showing a configuration of a power controller according to Embodiment 3.

A power controller according to Embodiment 3 of the present invention is described. FIG. 9 is a circuit diagram showing a configuration of the power controller according to Embodiment 3 of the present invention. Unlike the power controller according to Embodiment 1 shown in FIG. 1, power controller 1 in FIG. 9 includes a battery BAT directly connected to a power bus 2. Power controller 1 according to Embodiment 3 is different from power controller 1 according to Embodiment 1 in that power controller 1 according to Embodiment 1 controls and keeps bus voltage Vbus at a constant voltage, whereas power controller 1 according to Embodiment 3 controls and keeps battery BAT charging current Ichg at a constant current.

The components in FIG. 9 that are given the same reference signs as in FIG. 1 are the same as or corresponding to the components shown in FIG. 1, and description thereof will not be repeated. In power controller 1 shown in FIG. 9, battery BAT is connected to power bus 2, as mentioned above. Current detector 7 is connected to a negative terminal of battery BAT, and battery charging current Ichg detected by current detector 7 is output to a processing unit 3B. Processing unit 3B computes a shunt command value 6, based on the input battery charging current Ichg and a predetermined current command value, and outputs shunt command value 6 to a signal generator 4.

Power controller 1 according to Embodiment 3 supplies a load 5 with electric power generated by photovoltaic arrays I1 to In during sunlight hours and supplies the electric power as charging power to battery BAT, while shunting the generated electric power surplus at arbitrary time intervals in an arbitrary ratio, thereby controlling the charging current to suppress an increase of battery BAT charging current Ichg.

Next, an operation of the power controller according to Embodiment 3 is described.

Processing unit 3B included in the power controller according to Embodiment 3 outputs shunt command value 6 to reduce the difference between battery charging current Ichg and the current command value. In the following, an operation of processing unit 3B is described with reference to, but not limited to, applying PID (proportional-integral-derivative) control to a deviation Err. Deviation Err is the difference between battery charging current Ichg and the current command value. The current command value is based on Vbus across the battery, and determined according to charging conditions determined for each battery.

Initially, processing unit 3B takes a difference between battery charging current Ichg detected by current detector 7 and the current command value to calculate deviation Err. Deviation Err is represented by Equation (3):

$$\text{Err} = \text{Ichg} - \text{Current command} \tag{3}$$

As with Embodiment 1, processing unit 3B computes values of a proportional term, integral term, and derivative term based on Equation (2) for deviation Err, and outputs a signal obtained by adding the values together, as shunt command value 6. Any numeric values greater than or equal to 0 are chosen for constants KP, KI, and KD in Equation (2) to provide targeted control according to the circuit constants over the charging current to keep the charging current constant. While the power controller according, to Embodiment 1 controls voltage, the power controller according to Embodiment 3 controls current, and thus optimal constants in the power controller according to Embodiment 3 are different from those in the power controller according to Embodiment 1.

Shunt command value 6 is, as with Embodiment 1, a numeric value indicating an average number of switching elements that shut per control cycle, and an effective value of shunt command value 6 is any value from 0 to n. Shunt command value 6 being 0 means supplying all the generated electric power to a load and the battery, and being n means shunting all the generated electric power. Shunt command value 6 is transmitted from processing unit 3B to signal generator 4.

The power controller according to Embodiment 3 performs the same control as performed by the power controller according to Embodiment 1 to control and keep battery charging current Ichg constant. As with the power controller according to Embodiment 1, power controller 1 according to Embodiment 3 operates according to the timing chart in FIG. 2, and thus has features similar to the power controller according to Embodiment 1.

While the term of battery charging current Ichg is positive in Equation (3) for the deviation used for the description of Embodiment 3, it should be noted that the current command value may be positive, and the signs in the subsequent equations may be inverted. While the PID control is described as an example of Equation (2) for the shunt command value which is the operation amount, where the values of the proportional term, integral term, and derivative term for the difference between battery charging current Ichg and the current command value are computed and used, the operation amount and the equation may be replaced with any other operation amount and any other equation that allow the operation of increasing an amount of current to be shunt as battery charging current Ichg increases.

Operations corresponding to the operations of processing unit 3 included in power controller 1 according to Embodiment 3 may also be embodied in hardware or software of a digital circuit and carried out in the form of digital signal processing, as with Embodiment 1. In order to embody processing unit 3 in software and perform the processing, processing unit 3 may be embodied in a processor and a memory as shown in FIG. 10, for example, and the processor may be configured to process a program stored in the memory.

In addition, as with Embodiment 2, signal generator 4 included in power controller 1 according to Embodiment 3 may be replaced with signal generator 4 shown in FIG. 5. Further, while the example is described in which current detector 7 is connected t a negative terminal of battery BAT in the circuit diagram in FIG. 9, current detector 7 may be connected to a positive terminal of battery BAT. A bus capacitor, although not depicted in the circuit diagram in FIG. 9, may be provided to reduce pulsations (ripples) in battery charging current Ichg and bus voltage Vbus.

As such, the power controller according to Embodiment 3 has features similar to the power controller according to Embodiment 1, and thus can provide a highly responsive power controller having a reduced size and reduced weight, as with Embodiment 1. In addition, according to Embodiment 3, the power controller according to the present invention may be used as a power controller for controlling and keeping the battery charging current constant. This allows the power controller to be used onboard a satellite that employs, for example, a battery direct-connection bus, to control an amount of electric power supplied from solar cells.

REFERENCE SIGNS LIST

1 power controller; 2 power bus; 3A, 3B processing unit; 4 signal generator; 5 load; 6 shunt command value; 7 current detector; BAT battery; D1 to Dn diode (back flow prevention element); I1 to In photovoltaic array (power supply); S1 to Sn switching element.

The invention claimed is:

1. A power controller configured to be connected to a load and a plurality of power supplies which supply electric power, the power controller comprising:
a plurality of switching elements which are provided in one-to-one correspondence with the plurality of power supplies, and each of which switches on or off to switch between supplying and stopping supplying the load with electric power from a corresponding one of the plurality of power supplies;
a processing circuit configured to compute an operation amount for adjusting an amount of electric power supplied to the load; and
a signal generator configured to
determine, for each control cycle, a switching-element count indicating a total number of switching elements to be turned on among the plurality of switching elements and a duty ratio of the switching-element count, based on the operation amount, and
generate a drive signal for driving the plurality of switching elements successively, based on the switching-element count and the duty ratio, wherein
an order in which the plurality of switching elements drive to on or drive to off is predetermined, and
the signal generator generates the drive signal which causes the plurality of switching elements to drive to on or off in the predetermined order.

2. The power controller according to claim 1, wherein
the plurality of switching elements are given numbers different from one another, and
the signal generator
selects from among the plurality of switching elements a switching element to be first turned on,
based on the switching-element count, determines the switching elements to be turned on in forward or reverse order of the given numbers, the forward or reverse order starting from the switching element, and
changes the switching element to another switching element when the switching-element count increases or decreases.

3. The power controller according to claim 1, further comprising:
a plurality of backflow prevention elements connected in series to the plurality of power supplies in one-to-one correspondence, which prevent current from flowing back through the plurality of power supplies, wherein
the plurality of switching elements are connected in parallel to the plurality of power supplies in one-to-one correspondence, and each turn off to supply the load with the electric power from the corresponding one of the plurality of power supplies, and each turn on to stop supplying the load with the electric power from the corresponding one of the plurality of power supplies.

4. The power controller according to claim 1, wherein
the signal generator generates the drive signal at a time the switching-element count reduces or increases.

5. The power controller according to claim 3, wherein
the operation amount indicates an average value of a total number of power supplies to be short-circuited among the plurality of power supplies per control cycle, and
the amount of electric power supplied to the load is adjusted by adjusting the total number of power supplies to be short-circuited.

6. The power controller according to claim 1, wherein
the signal generator compares a carrier wave with the operation amount to determine the switching-element count and the duty ratio, the carrier wave being at least one of a sawtooth wave, an inverse sawtooth wave, or a triangle wave.

7. The power controller according to claim 1, wherein
as the switching-element count decreases, the signal generator drives off a switching element that has the longest on-time among switching elements being on.

8. The power controller according to claim 1, wherein
as the switching-element count increases, the signal generator drives on a switching element that has the longest off-time among switching elements being off.

9. The power controller according to claim 1, wherein
the signal generator compares carrier waves having different offsets with the operation amount and determines a pattern of turning on or off the plurality of switching elements to determine the switching-element count.

10. The power controller according to claim 1, wherein
the signal generator divides the operation amount into an integer part and a decimal part, compares the decimal part with a carrier wave to generate a comparison, and determines the switching-element count by adding the comparison and the integer part together.

11. The power controller according to claim 1, wherein
the signal generator changes allocation of the switching elements to be driven, based on failure information on a component included in the power controller.

12. The power controller according to claim 1, further comprising
a bus capacitor connected in parallel to the load, wherein
the processing circuit detects, from a variation in bus voltage, an amount of excess or deficiency of a supply status of the electric power supplied to the load, and computes the operation amount based on the amount of excess or deficiency.

13. The power controller according to claim 1, f comprising
a battery connected in parallel to the load, wherein
the processing circuit detects, from variations in bus voltage and battery charging current, an amount of excess or deficiency of a supply status of the electric power supplied to the load, and computes the operation amount based on the amount of excess or deficiency.

14. The power controller according to claim 1, wherein
the plurality of power supplies are photovoltaic arrays.

15. A power control method for operating a power controller configured to be connected to a load and a plurality of power supplies which supply electric power, the power controller including a plurality of switching elements which are provided in one-to-one correspondence with the plurality of power supplies, and each of which switches on or off to switch between supplying and stopping supplying the load with electric power from a corresponding one of the plurality of power supplies, the method comprising:
computing an operation amount for adjusting an amount of electric power supplied to the load;
determining, for each control cycle, a switching-element count indicating a total number of switching elements to be turned on among the plurality of switching elements and a duty ratio of the switching-element count, based on the operation amount;
generating a drive signal for driving the plurality of switching elements successively, based on the switching-element count and the duly ratio, an order in which the plurality of switching elements drive to on or drive to off being predetermined; and generating the drive signal which causes the plurality of switching elements to drive to on or off in the predetermined order.

\* \* \* \* \*